United States Patent

Christiansen et al.

[11] Patent Number: 6,150,290
[45] Date of Patent: Nov. 21, 2000

[54] CERAMIC MATERIAL FOR USE IN THE SEPARATION OF OXYGEN FROM GAS MIXTURE

[75] Inventors: Niels Christiansen, Gentofte; Petru Gordes, Greve, both of Denmark

[73] Assignee: Haldor Topsoe A/S, Lyngby, Denmark

[21] Appl. No.: 09/267,359

[22] Filed: Mar. 15, 1999

Related U.S. Application Data

[60] Provisional application No. 60/080,323, Apr. 1, 1998.

[51] Int. Cl.⁷ .................................................. C04B 35/50
[52] U.S. Cl. .................... 501/152; 423/263; 502/302; 502/303; 502/304; 502/525; 252/519.1; 252/519.12; 252/519.13; 252/519.15; 252/521.1
[58] Field of Search ............................ 501/152; 423/263; 502/302, 303, 304, 525; 252/521.1, 519.1, 519.12, 519.13, 519.15

[56] References Cited

U.S. PATENT DOCUMENTS

| | | | |
|---|---|---|---|
| 3,595,809 | 7/1971 | Kehl | 502/525 |
| 3,885,020 | 5/1975 | Whelan | 502/303 |
| 5,503,815 | 4/1996 | Ishii et al. | 423/263 |
| 5,604,048 | 2/1997 | Nishihara et al. | 501/152 |
| 5,858,902 | 1/1999 | Ishikawa et al. | 501/152 |

*Primary Examiner*—C. Melissa Koslow
*Attorney, Agent, or Firm*—Ostrolenk, Faber, Gerb & Soffen, LLP

[57] ABSTRACT

A perovskite ceramic material having the general formula:

$$A_xA'_{x'}A''_{x''}B_yB'_{y'}B''_{y''}O_{3-\delta},$$

wherein

A, A' and A'' each is one or more metals selected from the group of lanthanide metals;

B, B' and B'' each is a metal selected from the group of transition metals and group 3a, and noble metals of group 8b;

$x+x'+x''<1$ and/or $y+y'+y''<1$ such that $\Sigma x_i \neq \Sigma y_i$.

8 Claims, No Drawings

CERAMIC MATERIAL FOR USE IN THE SEPARATION OF OXYGEN FROM GAS MIXTURE

This application claims the benefit of U.S. Provisional Application No. 60/080,323, filed Apr. 1, 1998.

BACKGROUND OF THE INVENTION

1. Field of the Invention

The present invention relates to a ceramic material in particular to perovskite type ceramic for use in the manufacturer of ion and/or electron conducting ceramic products.

2. Description of the Related Art

Peroskite ceramic materials for use in oxygen separation membranes, having the general formula:

$$A_x A'_{x'} A''_{x''} B_y B'_{y'} B''_{y''} O_{3-\delta},$$

wherein $x+x'+x''=1$, and $y+y'+y''=1$, and $-1<\delta<1$ are known from U.S. Pat. No. 5,240,473.

The ceramic materials of the above US Patent have a stoichiometric perovskite composition, wherein $\Sigma x_i$ and $\Sigma y_i$ are 1.

It has been found by the present inventors that non-stoichiometric perovskite type ceramic materials, wherein $\Sigma x_i$ and/or $\Sigma y_i$ are less than 1, show an unexpectedly improved stability and reduced reactivity with metals or metal oxides supported on or otherwise combined with the ceramic material.

Furthermore, it has been proved by the present inventors that A-side deficits induce an increased electronic and ionic conductivity due to an increased defect concentration in the material.

SUMMARY OF THE INVENTION

Pursuant to the unexpected finding noted above, the present invention provides a perovskite ceramic material having the general formula:

$$A_x A'_{x'} A''_{x''} B_y B'_{y'} B''_{y''} O_{3-\delta},$$

wherein

A, A' and A'' each is one or more metals selected from the group of lanthanide metals;

B, B' and B'' each is a metal selected from the group of sodium alkaline earth metals transition metals, group 3a, and noble metals of group 8b;

$x+x'+x''<1$ and/or $y+y'+y''<1$ such that $\Sigma x_i \neq \Sigma y_i$.

Other features and advantages of the present invention will become apparent from the following description of the invention which refers to the accompanying drawings.

DETAILED DESCRIPTION OF THE PREFERRED EMBODIMENT

In a specific embodiment of the invention, the material has a composition with the formula:

$$La_a Ln_b M_c Ga_d M'_e O_{3-\delta},$$

wherein:

Ln is a combination of Ce, Pr and Nd and optionally a further lanthanide metal;

M is at least one alkaline earth metal;

M' is at least one metal selected from Group 2a, 3b, 4b, 5b, 6b, 7b, 8, 1b, 2b, 3a, 4a and noble metals of group 8b metals of the periodic table; and wherein $a+b+c<1$ and/or $d+e<1$ such that $a+b+c \neq d+e$.

EXAMPLE 1

Using drip pyrolysis procedure a ceramic powder was produced. Aqueous solutions of metal nitrates, acetates or carbonates were mixed in the required proportions according to the proposed chemical formula. Then combustion fuel such as glucose or glycine was added to the above solutions in order to get fuel-rich mixtures. The as prepared stock solutions were drip pyrolyzed into a rotary kiln. The resulting powders were characterized by using XRD, SEM, BET and the particle size distribution was determined using a laser light scattering technique.

The powders were found to have a perovskite structure.

This material of Example 1 may be used such as SOFC cathode material, oxidation catalyst and sensor and the proposed chemical formula is:

$$La_{0.407}Ce_{0.124}Nd_{0.120}Pr_{0.048}Na_{0.015}Ca_{0.007}Sr0.278Mn0.945O_{3-\delta}$$

The powder XRD lines for this compound are presented in Table 1.

TABLE 1

XRD characteristics of compound of Example 1.

| Interplanar Spacing (Å) | Peak Intensity (counts) | Relative Intensity (%) |
| --- | --- | --- |
| 3.877 | 74 | 17.1 |
| 3.528 | 28 | 6.5 |
| 3.455 | 23 | 5.3 |
| 3.165 | 36 | 8.3 |
| 2.742 | 433 | 100 |
| 2.472 | 5 | 1.1 |
| 2.343 | 16 | 3.7 |
| 2.238 | 66 | 15.2 |
| 2.045 | 12 | 2.7 |
| 1.936 | 106 | 24.5 |
| 1.732 | 10 | 2.4 |
| 1.582 | 86 | 20 |
| 1.369 | 31 | 7.2 |
| 1.290 | 3 | 0.7 |
| 1.224 | 22 | 5.1 |

EXAMPLE 2

Another material, which may be used for application such as: SOFC cathode, mixed electronic/ionic conductive membrane, oxidation catalyst and sensor, has been synthesized as mentioned in Example 1. The material has the chemical formula:

$$(La_{0.7}Sr_{0.3})_{0.9}Fe0.8Mn_{0.2}O_{3-\delta}.$$

This A-site deficient perovskite compound was proved to have better chemical stability towards Yttria-Stabilized Zirconia compared to that with A/B=1. Also, this compound showed high electronic conductivity (120 S/cm at 850° C. in air. The crystalline structure is rhombohedral with parameters (in hexagonal setting): $a_H=5.520$ Å, $c_H=13.510$ Å.

EXAMPLE 3

Another material which may be used for SOFC interconnection, and electronic ceramic compounds such as sensor and heating element in Magneto-Hydro-Dynamic (MHD) devices is:

$$La_{0.508}Ce_{0.048}Nd_{0.166}Pr_{0.068}Na_{0.013}Ca_{0.007}Sr_{0.179}CrO_{3-\delta}.$$

The as synthesized material (after the procedure mentioned in Example 1) showed a perovskite structure according to Table 2.

TABLE 2

XRD characteristics for compound of Example 2

| Interplanar spacing (Å) | Peak Intensity (counts) | Relative Intensity (%) |
| --- | --- | --- |
| 3.879 | 79 | 19.4 |
| 2.740 | 408 | 100 |
| 2.340 | 9 | 2.2 |
| 2.236 | 66 | 16.1 |
| 1.937 | 98 | 24 |
| 1.731 | 17 | 4.1 |
| 1.581 | 85 | 20.7 |
| 1.369 | 26 | 6.4 |
| 1.290 | 9 | 2.2 |
| 1.224 | 16 | 3.9 |

Pellets were cold pressed and sintered at 1600° C. The electric conductivity, at 1000° C., was dependent of environmental atmosphere as follows:

50.5 S/cm($P_{O2}$=0.21 atm) 26.0 S/cm($P_{O2}$=$10^{-16}$ atm) 6.4 S/cm ($P_{O2}$=$5 \cdot 10^{-18}$ atm).

EXAMPLE 4

Another material for SOFC electrolyte, oxygen ion membrane and catalyst is synthesized according to Example 1. The chemical formula in this Example is:

$$La_{0.54}Ce_{0.05}Nd_{0.18}Pr_{0.07}Sr_{0.15}Ga_{0.9}Mn_{0.1}O_{3-\delta}.$$

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A perovskite ceramic material having the general formula:

$$A_xA'_{x'}A''_{x''}B_yB'_{y'}B''_{y''}O_{3-\delta}$$

wherein

A is lanthanum, A' and A" each is one or more metals selected from the group of lanthanide metals;

B, B' and B" each is a metal selected from the group of Na, alkaline earth metals, transition metals, group 3a, and noble metals of group 8b;

$x+x'+x''<1$ and/or $y+y'+y''<1$;

$\Sigma x_i \neq \Sigma y_i$ such that the material is non-stoichiometric;

$-1<\delta<1$; and $\delta \neq 0$.

2. A ceramic material having the formula $La_aLn_bM_cGa_dM'_eO_{3-\delta}$, wherein Ln is a combination of Ce, Pr and Nd and optionally a further lanthanide metal;

M is at least one alkaline earth metal or sodium;

M' is at least one metal selected from Group 2a, 3b, 4b, 5b, 6b, 7b, 8, 1b, 2b, 3a, 4a and noble metals of group 8b metals of the periodic table; and wherein $a+b+c<1$ and/or $d+e<1$; and $a+b+c \neq d+e$ such that the material is non-stoichiometric, $-1<\delta<1$; and $\delta \neq 0$.

3. The ceramic material of claim 1, having the formula $La_{0.407}Ce_{0.124}Nd_{0.120}Pr_{0.048}Na_{0.015}Ca_{0.007}Sr_{0.278}Mn_{0.945}O_{3-\delta}$.

4. The ceramic material of claim 1, having the formula $(La_{0.7}Sr_{0.3})_{0.9}Fe_{0.8}Mn_{0.2}O3_{3-\delta}$.

5. The ceramic material of claim 1, having the formula $La_{0.508}Ce_{0.048}Nd_{0.166}Pr_{0.068}Na_{0.013}Ca_{0.007}Sr_{0.179}CrO_{3-\delta}$.

6. The ceramic material of claim 1, having the formula $La_{0.54}Ce_{0.05}Nd_{0.18}Pr_{0.07}Sr_{0.15}Ga_{0.9}Mn_{0.1}O_{3-\delta}$.

7. An ion and/or electron conducting material comprising the ceramic material of claim 1.

8. An ion and/or electron conducting material comprising the ceramic material of claim 2.

* * * * *